United States Patent Office 3,220,999
Patented Nov. 30, 1965

3,220,999
PROCESS FOR POLYMERIZING CONJUGATED DIENES
Edward W. Duck and Rinke Berkenbosch, both of Amsterdam, Netherlands, assignors to Shell Oil Company, New York, N.Y., a corporation of Delaware
No Drawing. Filed Feb. 13, 1962, Ser. No. 172,872
Claims priority, application Netherlands, Mar. 13, 1961, 262,314
8 Claims. (Cl. 260—94.3)

This invention relates to the polymerization of diolefins. More particularly, the invention relates to an improved process for polymerizing conjugated diolefins using certain metallic catalysts.

Processes are known for the polymerization of conjugated diolefins utilizing divalent cobalt and nickel halides as well as related carboxylates and complexes of such materials as catalyst either alone or in conjunction with certain cocatalysts. For the most part such processes result in polymers having either a low cis-1,4-content at normal or low intrinsic viscosity or products with preferred higher cis-1,4-content associated with relatively high intrinsic viscosities. It would be desirable for processability and other reasons to obtain polymers having both a high cis content and relatively lower molecular weight. Processes have been proposed in the past for accomplishing these objectives but for the most part utilized materials which are either costly or rare, or materials which are unstable or must be employed in substantial proportions in the reaction medium.

It is an object of the invention to provide a new process for polymerizing diolefins. It is a further object to provide a new process for preparing polymers of conjugated diolefins that have a high cis-1,4-structure. It is a further object to provide a process for preparing polymers of conjugated diolefins having a high cis-1,4-structure and better milling properties. It is a further object of the invention to provide new polymers of butadiene having high cis-1,4-structure and relatively low intrinsic viscosities, preferably between about 1.0 and 3.5. These and other objects of the invention will be apparent from the following detailed description of the invention.

Now, in accordance with the present invention, it has been found that these and other objects may be accomplished by the process which comprises contacting the diolefin with a catalyst of the group consisting of cobalt and/or nickel halides, carboxylates and their complexes in a substantially anhydrous relatively inert hydrocarbon medium, the diolefin being present in an amount of 1-25% by weight based on medium, said medium also containing 0.002-0.05% by weight based on the medium of a polycyclic polyunsaturated hydrocarbon containing at least two non-conjugated double bonds in the cyclic structure at a temperature between about −20° C. and 150° C. in the substantial absence of molecular oxygen and recovering as a polymerization product a rubbery polymer of high cis-1,4-content and a relatively low molecular weight. Preferably, the polycyclic unsaturated hydrocarbon is one in which only two non-conjugated double bonds are present. Still more preferably, the most effective class of polycyclic hydrocarbons for the present purpose comprises bicycloheptadienes.

One of the surprising features of this invention comprises the extremely small proportions of the polycyclic polyunsaturated hydrocarbons required for effective control of optimum relationships between high cis content and useful low intrinsic viscosities of the polymerized product. Materials such as vinylcycloolefins have been employed for the present purpose but it was necessary to utilize proportions in excess of 0.2 times the weight of the monomer present, which, under the usual circumstances, would mean that at least 2% by weight based on a 10% monomer solution of the vinyl cycloolefin would be required. In the present invention the proportion of polycyclic polyunsaturated hydrocarbon amounts to a mere trace of the additive material.

The process of the invention may be applied to the polymerization of any conjugated diolefin hydrocarbon. It is particularly useful for the polymerization of butadiene, as this conjugated diolefin is found to polymerize according to the present invention with ease and to produce a polymer having a very high proportion of cis-1,4-configuration. Other conjugated diolefins may be employed however such as 2,3-dimethyl butadiene-1,3; 2-ethyl butadiene-1,3; isoprene; 4-methyl hexadiene-1,3; 2-methyl pentadiene-1,3; 2-isopropyl butadiene-1,3; and the like. Not only may any conjugated diolefin be polymerized but 2 or more conjugated dienes may be copolymerized to produce desired products. A representative copolymer of this type is, for example, a copolymer of butadiene and isoprene prepared according to the present invention.

The quantity of the polycyclic polyunsaturated hydrocarbon to be utilized in the present invention may vary between about 0.002 and 0.05% preferably between about 0.002 and 0.02% by weight based on the diluent employed. The polycyclic controlling agents are preferably dienes containing 2 non-conjugated double bonds in the cyclic ring structure. Bicycloheptadienes are preferred for the present purpose. However, the generic aspect of the invention encompasses polycyclic hydrocarbons having more than 2 non-conjugated double bonds as well as the preferred dienes. Typical structures of suitable controlling agents are as follows.

Bicycloheptadienes:
    Bicyclo-(2,2,1)-2,5-heptadiene
    1-methyl bicyclo-(2,2,1)-2,5-heptadiene
    2-methyl bicyclo-(2,2,1)-2,5-heptadiene
    7-methyl bicyclo-(2,2,1)-2,5-heptadiene
Bicyclooctadienes:
    Bicyclo(5,1,0)-2,5-octadiene
    1-methylbicyclo(5,1,0)-2,5-octadiene
Polycyclopolyenes:
    Trimethanoanthracenes
    Binor tricyclenes
    Dimethanonaphthalenes
    Trimethanocyclopentanthracene
    Dimethanobiphenylene
    Dimethanonaphthindene
    Dimethanofluorene
    Methanoindene A preferred method of the process according to the present invention is that whereby during the polymerization no more than an extremely small amount of water is present, say in the order of a maximum of 0.05% by weight based on the reaction medium. These reaction environments can therefore be regarded as essentially or substantially anhydrous although some small trace of water may at times be desirable. In addition to or in place of any small trace of water which is present, hydrochloric acid or a metal halide such as tin tetrachloride or aluminum trichloride also can be used. These additives usually increase the rate of formation of the polymer. The extent of this increased rate depends, among other factors, upon the concentration and/or the polymerization temperature or pressure.

The cobalt and nickel salts which are the primary catalysts present may be used alone or in combination with certain organo metallic co-catalysts. Of the cobalt or nickel compounds, those preferred are soluble in the reaction mixture (usually a hydrocarbon) or in the diluent utilized in the polymerization. These are, for example, the cobalt and/or nickel salts of organic carboxylic acids such as naphthenic acids and saturated or unsaturated, branched or unbranched aliphatic carboxylic acids having more than 5 carbon atoms, usually 5–18 carbon atoms per molecule. They also can be complexes of cobalt or nickel halides; cobalt or nickel complexes of such halides or of the corresponding carboxylates with amines such as pyridine or alcohols or ketones as well as with aluminum halides, particularly aluminum alkyl halides, preferably aluminum alkyl sesquihalides, particularly the chlorides.

Suitable species of these materials include cobaltous bromide, cobaltous fluoride, cobaltous iodide, nickelous bromide, nickelous iodide, nickelous fluoride, nickelous nitrate, cobalt nitrate and the like. Particularly preferred are the bromides and chlorides of cobalt and nickel. In the preferred embodiment, the salts are utilized in the purified form free of water of crystallization. The co-catalyst, which may be employed together with the cobalt or nickel salts may be any of the compounds having an organo radical and preferably an alkyl radical attached directly to metals. These include metal trialkyls, metal dialkyl halides, and metal monoalkyl dihalides as well as metal dialkyl dihydrides. Examples include among others aluminum alkyls, lithium alkyls, zirconium alkyls, cobalt alkyls and the like. Typical species are aluminum tributyl, aluminum triethyl, aluminum triisobutyl, aluminum triamyl, aluminum triisopropyl, aluminum isobutyl sesquihalide, aluminum diethyl hydride, aluminum butyl dichloride and the like. Especially preferred are those having alkyl groups containing from 1–8 and preferably 1–6 carbon atoms each.

The catalysts may be added as such or in combination with a solid carrier or in solvent solution, the latter being preferred. Suitable solvents include: saturated aliphatic, cyclo-aliphatic, and/or aromatic hydrocarbons such as hexane, isooctane, cyclohexane, benzene or toluene as well as mixtures of benzene with butenes. The nature of the medium can also have a strong influence on the polymerization, notably on the rate of the polymerization. For example, butadiene polymerizes much faster in aromatic than in aliphatic media but the reverse is true with isoprene. Non-polar solvent media are preferred since this promotes the formation of polymers having a high cis content.

The ratios between the quantities of catalyst components can be varied within wide limits. For example, if aluminum halide or aluminum alkyl compounds are applied, either with the cobalt or nickel salts, the atomic ratio of aluminum to cobalt or nickel should usually vary between about 10:1 and 100,000:1.

In the polymerization of conjugated dienes, the hydrocarbon soluble cobalt and/or nickel compounds have a surprisingly large effect as components of catalyst systems but at very low concentrations. These concentrations are preferably even lower than that corresponding to 0.5 milliatom of cobalt or nickel per liter of diluent, e.g., 0.01–0.03 milliatom per liter. Naturally, these low concentrations are attractive because of the decrease in chemical consumption and the reduced necessity for purification of the resulting polymeric product. This corresponds preferably to an amount of the nickel or cobalt catalyst ranging from about 0.001 to about 0.01 mol per mol of the conjugated diene. While still larger amounts of catalyst up to about 0.1 mol may be employed, there appears to be no substantial advantage obtained by the use of such larger amounts.

The temperatures employed during polymerization normally lie between about −20° C. and 150° C., preferably between 0 and 70° C. Higher and lower temperatures are however not excluded in special instances. Suitable pressures up to about 5 atmospheres absolute may be utilized and pressures between 1 and 5 atmospheres are preferred when gaseous dienes are polymerized. Higher or lower pressures may be for particular purposes.

From the foregoing it follows that the process according to the invention offers many possibilities of control. Variable conditions are: the choice of the various components of the catalyst system, the concentrations of these components, the ratios of these concentrations, the choice of the medium and, if applied, the ratio of aliphatic to aromatic hydrocarbons in the medium, the ageing of the catalyst, i.e., the time during which the catalyst components are allowed to react with each other before the polymerization, the temperature at which this reaction or ageing takes place, and finally, temperature and pressure during the polymerization. Hence, this process can easily be adapted, even when high and varied requirements are made upon the nature of the product and the rate of the polymerization. An important point is that the average molecular weight of the polymer can be controlled in accordance with the requirements in an entirely satisfactory manner, without application of hydrogen during the polymerization, and without the content of cis-1,4-configuration being adversely influenced.

The preparation of the catalyst, as well as the polymerization of the conjugated dienes, according to the invention, can be carried out batchwise or continuously; the latter process can, if desired, be carried out in reaction mixtures of a constant composition which are kept homogeneous.

*Example I*

Comparative experiments were carried out in flasks which were equipped with a stirring device and from which the air was expelled by dry, oxygen-free nitrogen. 1000 ml. of benzene (at 50° C., under a nitrogen blanket) were added to each flask, which, unless stated otherwise, contained less than $1 \times 10^{-4}$ percent by weight of water and, in addition, 10% by weight of butadiene. Subsequently, aluminum ethyl sesquichloride and bicyclo(2,2,1)-hepta-2,5-diene (BCH) were added to this solution and in a few cases also a solution of $SnCl_4$ in benzene. For comparison, in two experiments no BCH and no $SnCl_4$ was applied, and in one experiment no BCH was used while $SnCl_4$ was present. Finally, a solution (in benzene) of the cobalt salt of 2-ethylhexanecarboxylic acid was added, whereupon the polymerization started. For each experiment the concentrations in which the compounds mentioned were present in the reaction medium are stated in the following table. During the polymerization the temperature was kept at 5° C. After 2 hours the polymerization was discontinued by addition of ethanol, in which 2,2′ - methylene - bis - (4 - methyl - 6 - tert - butylphenol) was dissolved as antioxidant, after which the polymer was coagulated by further addition of ethanol. The coagulate was separated, washed with fresh ethanol, dried under vacuum at 60° C. and weighed. Of the butadiene polymers obtained the intrinsic viscosity (I.V.) (in solution in toluene at 25° C.) as well as the Hoekstra plasticity and the percentages of cis-, trans- and 1,2-polymer were determined.

| Concentration of— | | | | | Polymer | | | | |
|---|---|---|---|---|---|---|---|---|---|
| Al | Co | $H_2O$ | $SnCl_4$ | BCH | I.V. | Hoekstra plasticity | Structure, percent | | |
| Miliatoms per litre | | Percent by weight | | | | | Cis 1:4 | Trans 1:4 | 1:2 |
| 5 | 0.03 | $<10^{-4}$ | | | 2.4 | 41 | 96.7 | 1.3 | 2.0 |
| 10 | 0.03 | $<10^{-4}$ | | | 2.5 | 47 | 96.1 | 1.6 | 2.3 |
| 5 | 0.03 | $<10^{-4}$ | $50\times10^{-4}$ | | 2.3 | 50 | 96.8 | 1.3 | 1.9 |
| 5 | 0.03 | $<10^{-4}$ | | $50\times10^{-4}$ | 2.5 | 27 | 97.3 | 1.1 | 1.6 |
| 10 | 0.03 | $<10^{-4}$ | | $50\times10^{-4}$ | 1.8 | 10 | 96.4 | 1.5 | 2.1 |
| 5 | 0.03 | $<10^{-4}$ | $50\times10^{-4}$ | $50\times10^{-4}$ | 2.3 | | 98.0 | 1.0 | 1.0 |
| 5 | 0.03 | $20\times10^{-4}$ | | $50\times10^{-4}$ | 1.4 | | 98.1 | 1.2 | 0.7 |

*Example II*

A series of experiments has been carried out in a manner similar to that mentioned in Example I, in which the aluminum ethyl sesquichloride was replaced by aluminum diethyl chloride and cobalt-2-ethyl hexoate by the complex compound $CoCl_2 \cdot AlCl_3$. In addition, a 23% w. butadiene solution in benzene was applied, while the benzene contained $20\times10^{-4}$ or $<10^{-4}$ percent w. of water. The aluminum diethyl chloride concentration was $$175\times10^{-4} \text{ percent w.}$$

the $CoCl_2 \cdot AlCl_3$ concentration $1\times10^{-4}$ percent w. The polymerization took place at 25° C. The remaining data are mentioned in the table below.

| $H_2O$ | BCH | Polymer | |
|---|---|---|---|
| Concentration, percent w | | I.V. | cis 1:4 contents, percent |
| $20\times10^{-4}$ | 0 | 6.9 | 97.5 |
| $20\times10^{-4}$ | $50\times10^{-4}$ | 3.8 | 97.6 |
| $20\times10^{-4}$ | $100\times10^{-4}$ | 1.8 | 97.7 |
| $20\times10^{-4}$ | $200\times10^{-4}$ | 1.1 | 97.0 |
| $<10^{-4}$ | 0 | 4.3 | 86.1 |
| $<10^{-4}$ | $50\times10^{-4}$ | 4.1 | 93.2 |

The polymers prepared by the process of the invention have a high 1,4-structure, e.g., at least 90% and preferably above 96% cis-1,4-structure as determined by infrared analysis. They normally have intrinsic viscosities from about 1 to about 4, preferably between about 1.5 and 3.5. These intrinsic viscosities are determined in toluene by conventional procedures, at 25° C.

The polymers prepared by the process of the invention may be utilized for a great many important industrial applications. They may be employed, for example, in the preparation of molded rubber articles such as tires, belts, tubes and the like or may be added alone or with other polymeric materials to known rubber compositions to improve specific properties such as impact resistance. They also may be used in the preparation of impregnating and coating compositions or may be combined with asphalts, tars and the like to form surfacing compositions for roads and walkways.

In forming rubber articles from the polymers produced by the process of the invention, it is preferred to compound the polymer with the necessary ingredients such as tackifiers, plasticizers, stabilizers, vulcanizing agents, oils, carbon black and the like and heating to effect vulcanization. The controlled intrinsic viscosity of the products prepared in the presence of the polycyclic polyunsaturated hydrocarbons according to the present invention improves the ease with which the polymers may be incorporated with these various modifying materials.

We claim as our invention:

1. A process for polymerizing conjugated diolefin hydrocarbons which comprises contacting the diolefin with a catalyst comprising
   (a) a cobalt compound of the group consisting of
      (1) cobalt carboxylates, and
      (2) cobalt chloride-aluminum chloride complexes with
   (b) an aluminum alkyl chloride, in a substantially anhydrous relatively inert hydrocarbon medium, the diolefin being present in an amount of 1–25% by weight of the medium, said medium also containing 0.002–0.05% by weight based on the medium of a polycyclic non-conjugated polyunsaturated hydrocarbon of the group consisting of bicycloheptadiene, bicyclooctadiene, and methyl-substituted products thereof, at a temperature between about —20° C. and 150° C., in the substantial absence of molecular oxygen, and recovering as a polymerization product a rubbery polymer having a high cis-1,4-content.

2. A process according to claim 1 wherein the conjugated diene is butadiene.

3. A process according to claim 1 wherein the catalyst comprises a cobalt carboxylate.

4. A process according to claim 1 wherein the cocatalyst is an aluminum alkyl sesquichloride.

5. A process according to claim 1 wherein the non-conjugated polycyclic hydrocarbon is a bicycloheptadiene.

6. A process according to claim 5 wherein the polycyclic hydrocarbon is bicyclo(2,2,1)-2,5-heptadiene.

7. A process for producing rubbery polybutadiene having a high cis content which comprises polymerizing butadiene in the presence of a cobalt carboxylate aluminum alkyl sesquichloride catalyst in an essentially inert aromatic hydrocarbon medium the butadiene being present in an amount of 1–25% by weight based on the medium, said medium also containing 0.002–0.02% by weight based on the medium of bicyclo(2,2,1)-2,5-heptadiene at a temperature between about 0° and 70° C. in the substantial absence of molecular oxygen and under substantially anhydrous conditions and recovering as polymerization product of butadiene.

8. A process for producing rubbery polybutadiene having a high cis content which comprises polymerizing butadiene in the presence of a cobalt 2-ethylhexoate-aluminum ethyl sesquichloride catalyst in benzene, the butadiene being present in an amount of 1–25% by weight based on benzene, said benzene also containing 0.002–0.02% by weight of bicyclo(2,2,1)-2,5-heptadiene at a temperature at about 5° C. in the substantial absence of molecular oxygen and under substantially anhydrous conditions, and recovering as polymerization product of butadiene.

References Cited by the Examiner

UNITED STATES PATENTS 3,005,811  10/1961  Youngman _____ 260—94.3
3,063,973  11/1962  Gladding et al. _____ 269—79.5
3,067,187  12/1962  Greenberg et al. _____ 260—94.2

FOREIGN PATENTS 1,104,703  4/1961  Germany.
701,211  12/1953  Great Britain.

JOSEPH L. SCHOFER, *Primary Examiner.*

M. LIEBMAN, *Examiner.*